M. MATHY.
MACHINE FOR DRAWING COLORED LINES OR CRYSTAL OR GLASS OBJECTS.
APPLICATION FILED JULY 15, 1915.

1,298,753.

Patented Apr. 1, 1919.
5 SHEETS—SHEET 2.

*Fig 2.*

Maurice Mathy
Inventor,
by Lawrence Langner
Attorney

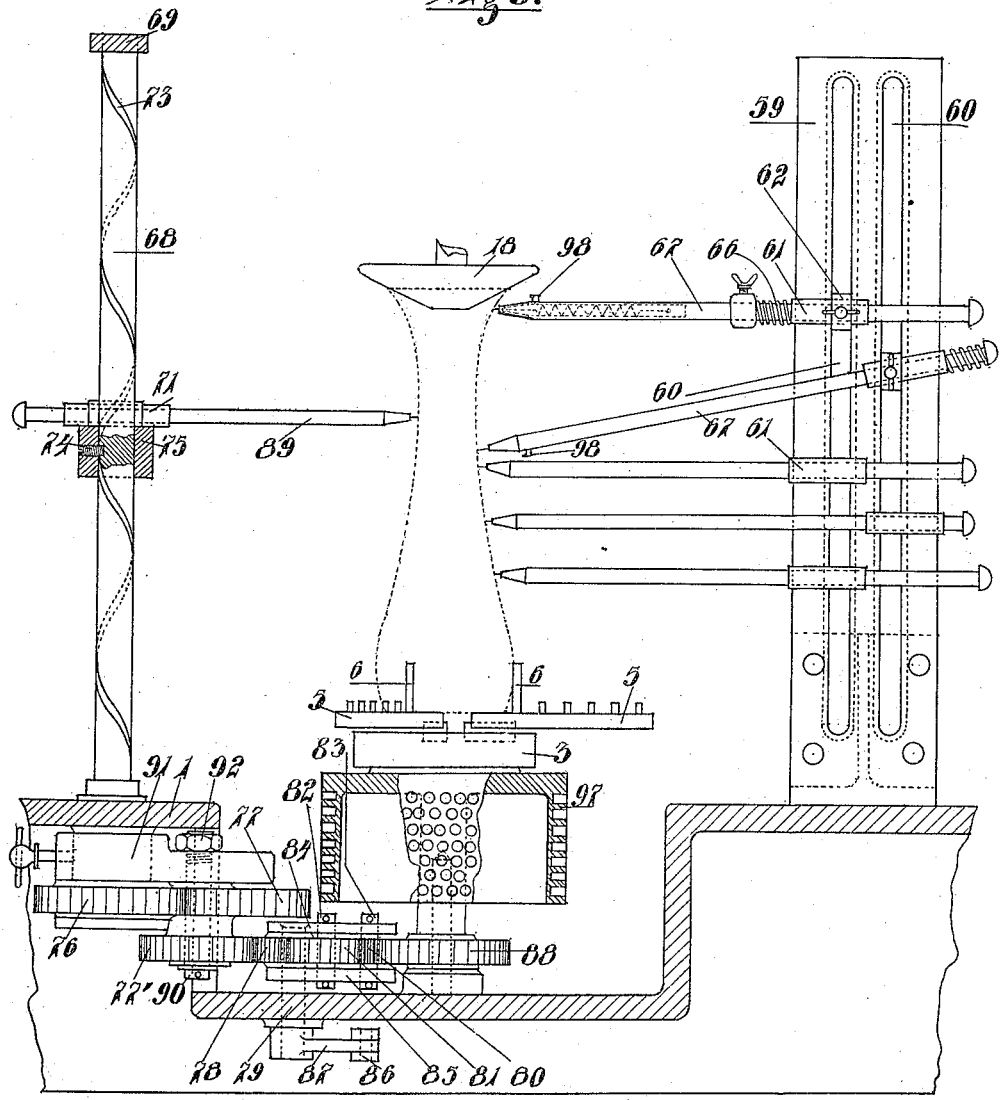

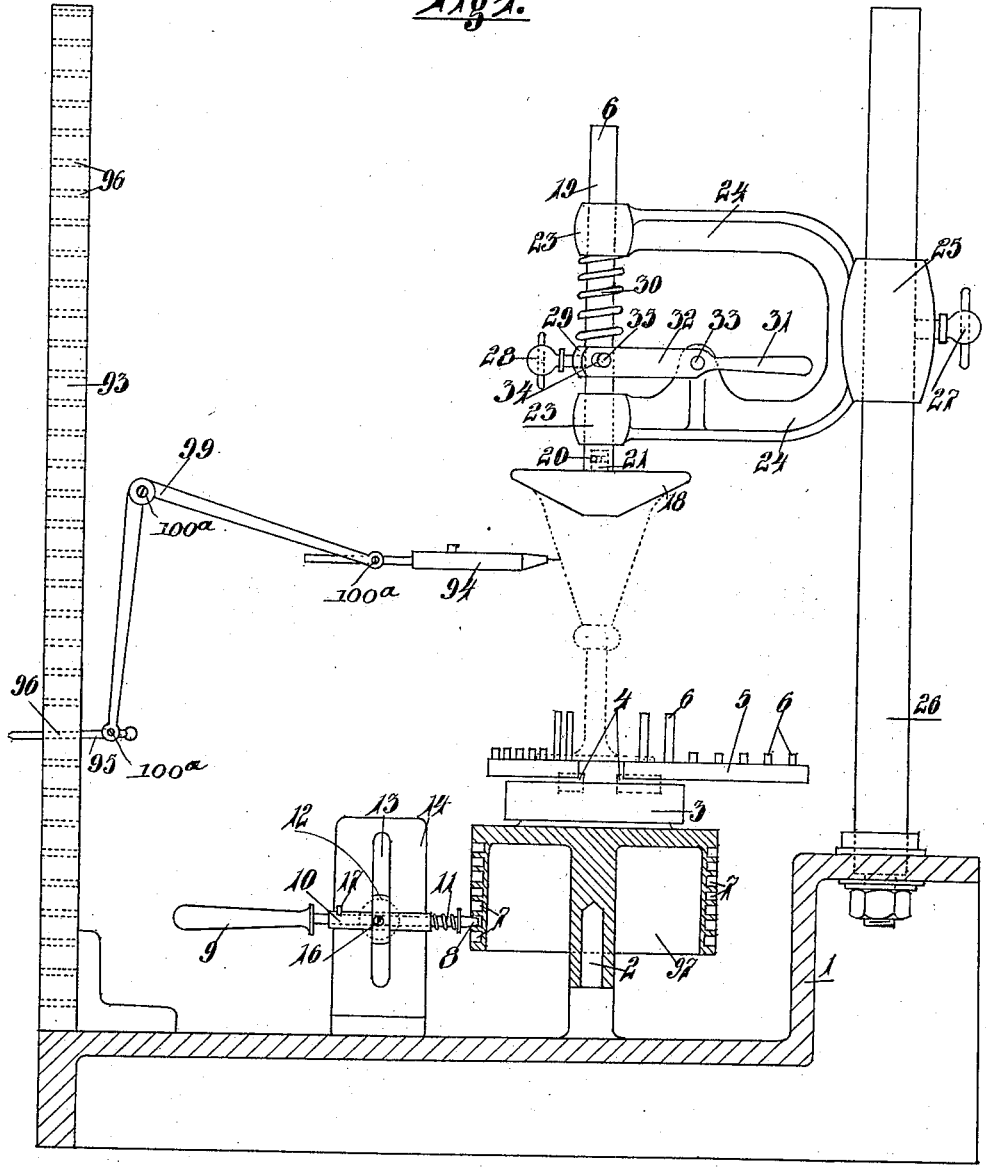

M. MATHY.
MACHINE FOR DRAWING COLORED LINES OR CRYSTAL OR GLASS OBJECTS.
APPLICATION FILED JULY 15, 1915.
1,298,753.
Patented Apr. 1, 1919.
5 SHEETS—SHEET 5.
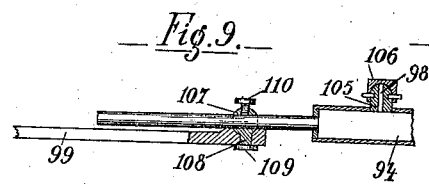
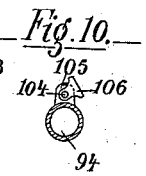
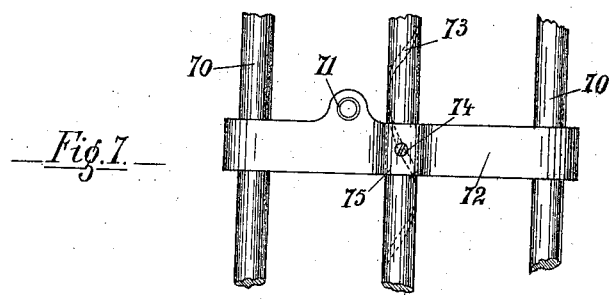
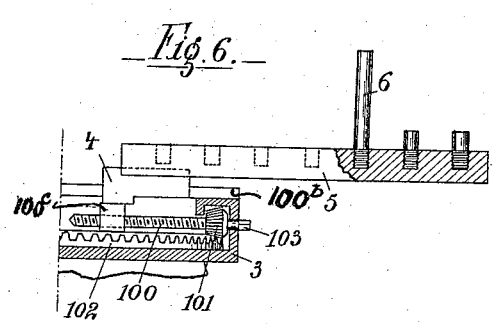
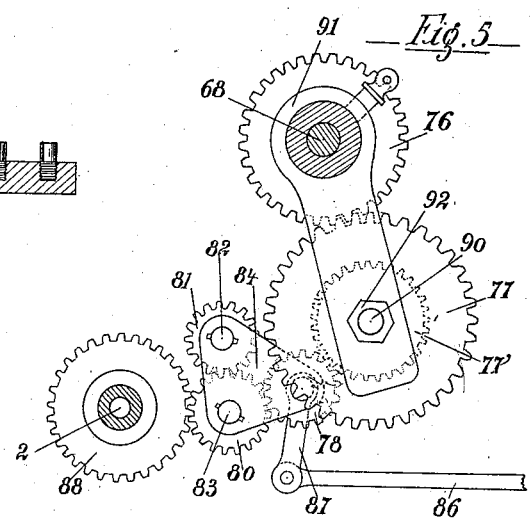
Maurice Mathy,
Inventor
by Laurence Languin
Attorney

UNITED STATES PATENT OFFICE.

MAURICE MATHY, OF FLEMALLE GRANDE, BELGIUM.

MACHINE FOR DRAWING COLORED LINES ON CRYSTAL OR GLASS OBJECTS.

1,298,753.  Specification of Letters Patent.  Patented Apr. 1, 1919.

Application filed July 15, 1915. Serial No. 40,074.

*To all whom it may concern:*

Be it known that I, MAURICE MATHY, a subject of the Kingdom of Belgium, residing at Flemalle Grande, Belgium, 28 Rue Leopold, have invented certain new and useful Improvements in Machines for Drawing Colored Lines on Crystal or Glass Objects; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention has for its object a machine for drawing colored lines on crystal or glass objects, in order to prepare said objects before cutting. This machine renders it possible to trace easily on the piece to be cut the exact divisions which may be used as guiding-marks by skilful workmen or also to trace completely all the lines of the patterns to be cut, when cutting is effected by unexperienced workmen.

The machine comprises a horizontal rotary universal plate with self-centering clamps, between which clamps the glass object may be fixed and automatically centered; the object is at the same time held fast at its top in such manner as to rotate freely. The plate rotates in the middle of a table upon which are secured, around the rotary plate, the various devices used for tracing the different kinds of lines. The first of these devices comprises a tracing pencil supported in such a manner as to move in a plane comprising the axis of rotation of the plate and whereby it is possible to trace on the object lines comprised in any axial plane of the object, after the plate has been fixed in the corresponding position by means of a suitable arresting member. Another device is provided with vertical pencils by means of which it is possible to trace on horizontal surfaces, when the plate is rotated continuously, concentric circles having their centers on the axis of rotation of the object. Another similar device provided with pencils serves to trace obliquely or horizontally disposed, concentric circles on oblique or vertical surfaces. A device for tracing helical curves is also provided and it comprises a pencil adapted to slide on a vertical column and connected to a driving apparatus for the rotary plate by any suitable means in such a manner that the rotation imparted to the plate is always proportional to the vertical movement of the pencil. In order to trace arcs of circles, ogives and other curves, the table is provided with a vertical board in which are bored a number of holes adapted to receive the jointed end of one leg of a compass, the other leg of which is provided with a pencil.

The drawings show, by way of example, a preferred embodiment of the invention.

Figs. 2, 3 and 4 are side-views of the various devices used for tracing, for holding the objects and for fixing the plate when necessary. The views in Figs. 2 and 3 are taken at right angles to the view shown in Fig. 4 and certain parts of the arrangement are shown in section while other parts have been omitted for the sake of clearness.

Fig. 5 is a plan view of the gearing located at the upper right-hand part of Fig. 1.

Fig. 6 is a partial sectional elevation of the supporting plate or chuck for the work.

Fig. 7 is a partial front view of the tracing device shown at the left hand side of Fig. 3.

Figs. 8, 9 and 10 show details of construction.

Figure 1:
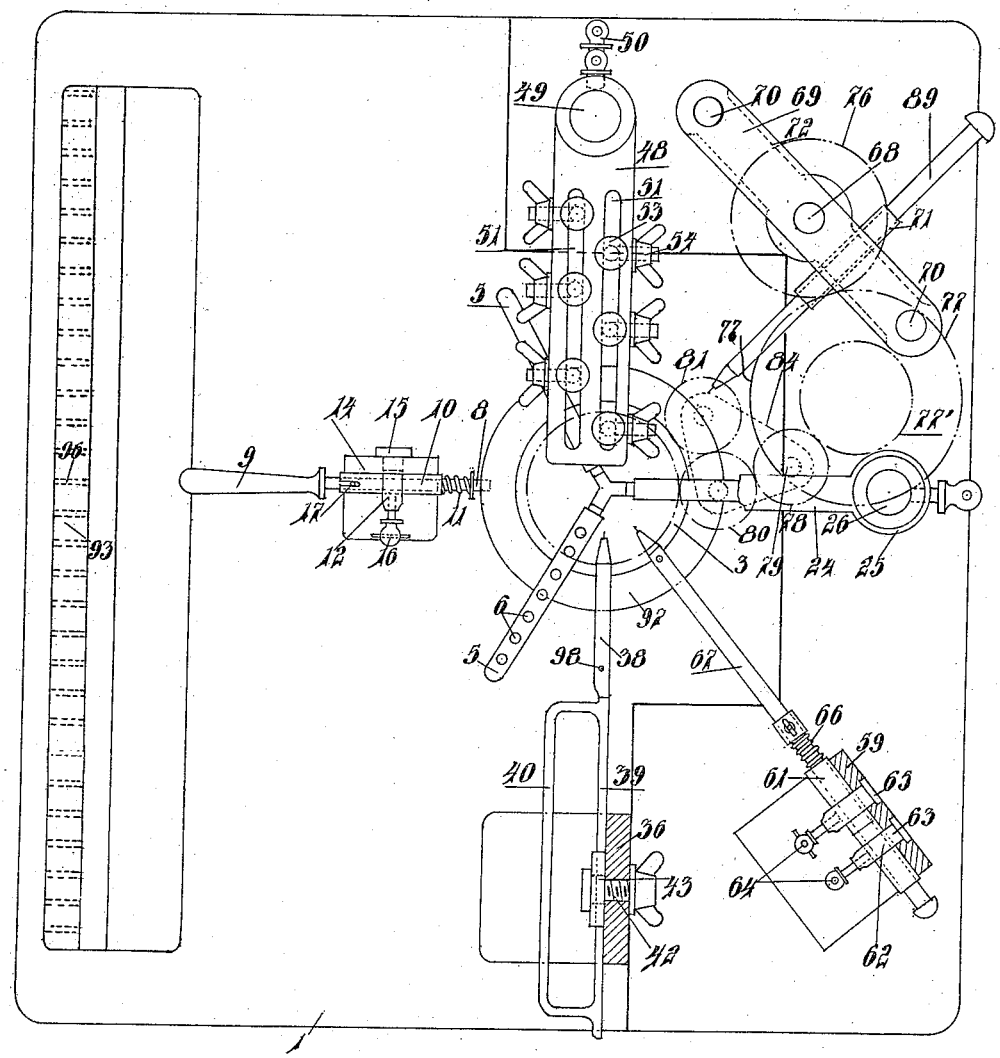
Figure 1 is a plan view of the machine.

In the center of the table 1 is secured a vertical pin 2 around which turns freely the plate or chuck 3 used for holding the object to be worked. The chuck 3 is turned by hand or by manually operated means as hereinafter described and is similar in construction to the universal chucks used in machine-tools, and is provided with three clamps 4 connected to each other in such a manner that it is possible to cause them to move nearer to the center simultaneously by means of the arrangement shown in Fig. 6. The chuck 3 is provided with radial slots 100$^b$ in which the clamps 4 are mounted so that the threaded lugs 100$^c$ thereof embrace the threaded rods 100. Each rod carries near its end a conical pinion 101 which is adapted to engage with an annular rack 102 adapted to rotate in the chuck 3. The outer ends 103 of the rods 100 are made square so that when a key is applied to one of said ends and turned, the rack 102 will be angularly displaced and movement will be imparted simultaneously to the several clamps. Each of the clamps is provided with a lengthening-piece 5 covered with india-rubber, on which little pins 6 may be fixed which are also covered with india-rubber. Three of these pins fixed on the lengthening-pieces at the same distance from the center grasp between them the object to be held, when the clamps are caused to slide nearer to the center; and at the same time automatically center the object on the plate. A drum 97 fixed to the plate 3 is provided with seven series or rows of holes 7 arranged at different distances from each other, which holes are used in conjunction with an arresting-spindle 8 for fixing the rotary drum in any desired position. This spindle 8, which is operated by means of a handle 9, slides in a tubular guide 10 and is caused to enter into the holes 7 by the action of a spring 11. The guide 10 passes through the cylindrical hole of a movable bracket 12, which is capable of sliding in a slot 13 formed in a vertical plate 14 while its cylindrical head 15 is applied against the plate 14. A thumb-screw 16 is used in order to fix simultaneously the tube 10 and the bracket 12 at the required height. When the arresting-spindle 8 is forced into one of the holes 7, the pin 17 provided on said spindle slides in a corresponding slit in the tube 10. When it is desired to prevent the spindle 8 from arresting the drum 97, it is only necessary to pull the spindle away from the drum and to turn it so that the pin 17 is out of register with the slot.

In addition to the fixing means for the bottom of the object, it is also necessary to provide means for preventing said object from being thrown down. For this purpose there is employed a conical buffer 18 arranged coaxially with the rotary chuck 3 and loosely mounted upon a vertical rod 19. The buffer is connected to the rod 19 by means of a pin 20 engaging with an annular groove formed in the projection 21 of the buffer. In this way, the buffer is allowed to turn freely together with the object 22 to be worked. The vertical rod 19 is held in bearings 23 formed on a frame 24 which is provided with a socket 25 adapted to slide on a vertical post 26 secured by means of a nut to the table 1. The frame 24 may be fixed at any required height on the post by means of a thumb-screw 27. On the rod 19 is fixed by means of the screw 28 a ring 29 which is forced downward by the spring 30 used for holding the buffer in contact with the object. When removing the object from the machine, it is first, necessary to raise the buffer, which is done by operating the lever 31. The lever is pivoted at 33 on the frame 24 and bifurcated at its end 32; and the two arms of the fork 32 are provided with slots 34 through which pass two pins 35 projecting from the ring 29, in such a manner that the ring may be raised by the fork 32.

The right hand portion of Fig. 2 shows the device used for tracing vertical lines on the object; and it comprises a vertical plate 36 suitably bolted or otherwise secured to the table 1 and provided with a vertical slot 37. The pencil 38 is secured to or formed integral with a pencil-holder 39 formed as a plate provided with a handle 40 and a longitudinal slot 41. As shown in Fig. 1, the handle 40 is loop-shaped and extends outwardly from the upper part of the pencil-holder 39 at right angles thereto. A screw-bolt 42 passes through the slots 37 and 41, while the collar 43 of said bolt enters in the slot 41 only. In this way, it is possible to fix the bolt 42 at any required height on the plate 36 and at the same time to allow the pencil-holder to slide and turn freely on the bolt. A plate 44 embraces the pencil-holder 39, and serves to hold the same in contact with the plate 36 during its movements. The pencil 38 is formed as a tapered tube filled with a colored liquid and the small opening at the tapered end thereof is stopped by a little ball or valve 45, pressed against the opening by the spring 46. A point 47 fixed to the ball in alinement with the axis of the pencil, projects outwardly in such a manner that when the tapered end of the pencil is pressed against an object, the point 47 drives the ball 45 into the tube, allowing the colored liquid to flow out. Each of the pencils is provided with a re-filling aperture 98, Figs. 9 and 10, which is formed in a protuberance 105 having its upper part of spherical formation. A shutter 106 is pivoted at 104 so as to closely fit the spherical end of the protuberance 105 and said shutter is adapted to be turned as shown in Fig. 10 to expose the aperture 98 for re-filling the pencil. When the workman desires to trace a vertical line on the object, he first secures the chuck 3 in the required position by means of the spindle 8, then he presses the tapered end of the pencil against the object and traces the line on the surface of the object by turning the pencil point about its pivotal axis. It being understood that the pencil-holder 39 is free to slide on as well as rotate about the pivot 42.

A side-view of the device used for tracing concentric circles on horizontal surfaces of the object, is shown in the left hand portion of Fig. 2. This device comprises a horizontal arm 48 adapted to slide on a post 49 secured to the table 1, and to be fixed in any desired position by means of a screw 50. The arm 48 is provided with two parallel slots 51 through which pass the tubular pencil-holders 52. These pencil holders are secured in the required position by means of collars 53 provided with a screw-threaded rod and nut 54, said rod passing through a horizontal slot 55 extending throughout the length of the arm 48. The pencils 56 are normally forced upward by springs 57 and they are similar in construction to these hereinbefore described and are filled with liquid through opening formed at their upper ends. A circle may be traced by bearing on one of the pencils until its point is in contact with the object, and at the same time causing the plate 3 to rotate continuously. When the device is not used, the arm 48 may be turned around the post 49 so as to be clear of the center of the table 1; with this object in view, the arm 48 is freely supported upon a ring 58 that may be secured to the post 49 at any desired height.

The right hand portion of Fig. 3 shows a side view of the device used for tracing crowns or horizontal circles upon oblique or vertical surfaces of the object. A vertical plate 59 is provided with two parallel slots 60; and each of the tubular pencil-holders 61 is fixed in the ring of a bracket 62 Fig. 8 provided with a round rod 63 which passes through the slot 60 and which is allowed to slide and to turn in said slot. It is possible to secure the movable bracket 62 to the plate 59 and at the same time secure the pencil-holder in the bracket by means of a thumb-screw 64, the end of which is forced against the tube 61 while the head 65 of the rod 63 is pressed against the plate 59. Springs 66 are used in order to remove the pencils from the object as soon as manual pressure is relieved. The spring of the upper pencil is attached at its ends to the pencil and the tube 61 so that when the pencil is pressed down, said spring will be stretched and tend to oppose said movement. In the case of the second pencil shown in inclined position, the spring is compressed when the pencil is moved up to the work. It is possible to trace all the circles required, by pressing the various pencils 67 toward the object and at the same time causing the plate 3 to rotate continuously.

The device used for tracing helical curves, is shown in the left hand portion of Fig. 3, and comprises a vertical cylindrical post 68 adapted to turn without sliding in two bearings, one of which is formed in the table 1 and the other in a cross head 69 supported by two fixed posts 70. The tubular pencil-holder 71 is secured to a movable cross plate 72 which is guided in its movements by three sockets slidably mounted on the three posts 68 and 70 Fig. 1. The post 68 is provided with a helical groove 73 in which is arranged the end of a screw 74 projecting inwardly in the middle socket 75 of plate 72. It will be understood that in this way if the plate 72 is caused to slide downward on the three posts, the post 68 will be rotated continuously by the projection 74. This rotary motion of post 68 is transmitted to the rotary plate 3 by means of a set of toothed wheels. A wheel 76 fixed to the post 68 drives a wheel to which is secured a wheel 77′ mounted on the same axle. The wheel 77′ drives a wheel 78 loosely mounted on the axle 79; and the rotary motion is then transmitted to the wheel 80 and afterward to the wheel 81. These two wheels are mounted on axles 82 and 83 which are borne by two plates 84, 85 rigidly secured to an axle 79. By means of the operating rod 86 connected to the lever 87 fixed to the axle 79, the two plates 84, 85 may be rotated with the axle 79 so as to mesh one or other of the wheels 80 or 81 with the wheel 88. As the axle of the wheel 88 is mounted on the axle of the rotary plate 3 and secured to said plate, it will be seen that by this way the plate 3 may be rotated in a clockwise or a counterclockwise direction as desired. When the workman wishes to trace a helical line on the object, he first removes the arresting spindle 8 from the drum 97; then he causes the pencil 89 to slide in the pencil-holder 71 and to contact with the object, and at the same time he causes the cross arm 72 to slide downward along the post 62. According to the direction of rotation of the plate 3, the pencil will trace a right-handed or left-handed helical line. It is possible to change the pitch of the helical curves traced, by varying the dimensions of the wheels 77 and 77′. The shaft 90 on which these two wheels are mounted can be readily removed from the bracket 91 to which it is fixed by means of the nut 92; the wheels 77 and 77′ can then be changed for others of the dimensions required.

The device intended for tracing arcs of circles, ogives and other curves comprises a plate 93 in which there are bored a large number of holes 96. The curves are traced by means of a compass 99 especially constructed for this purpose. The pencil 94 of the compass is jointed to the end of one of the two legs, while at the end of the other leg is jointed a point 95 which may be introduced in the holes 96 of plate 93. The method of mounting the pencil 94 on the compass is shown in Fig. 9, where the stem of the pencil is made a friction fit in the spherical member 107 which is provided with a stem 108 entering an aperture or opening on the leg of the compass. A screw nut 109 on the stem 108 serves to lock the spherical member 107 in position. The stem of the pencil is retained in position by a screw stud 110. A similar construction may be employed between the point 95 and the other leg of the compass. All the joints of the compass may be rendered immovable by means of screws 100ª when all the members of the compass have been arranged in the position required, so that the compass is perfectly rigid. The lines are traced by pressing the pencil against the object and at the same time turning the compass about the point 95. During this operation, the point 95 of the compass is allowed about the point 95 and to slide in the hole 96 in which it has been introduced.

What I claim is:

1. A machine for tracing colored lines on crystal or glass objects, comprising a horizontal table, a rotary plate arranged in the center of said table, means for holding the object to be worked in the center of the plate, means for rendering at will the said rotary plate immovable or free to rotate continuously, and a plurality of tracing devices arranged around the plate and comprising a plurality of pencils, a vertical plate secured to the table, a pencil holder pivoted on said plate so as to be capable of angular movement in a vertical plane, and of longitudinal movement toward and away from the rotary plate, a plurality of vertically mounted pencil holders adapted to be displaced horizontally, a second vertical plate secured to the table, a plurality of horizontal tubular pencil holders pivotally carried by and slidable along said vertical plate, a post having a helical groove rotatably mounted on said table, a horizontal pencil holder embracing said post, means on said holder for engaging the helical groove in the post in such a manner that when the pencil is moved vertically the post is caused to rotate, means for operatively connecting said post with the rotary table so as to cause the table to rotate during the vertical movement of said pencil holder, a vertical plate having a vertical series of horizontal holes therein, and a compass having one of its legs slidably and rotatably mounted in one or another of said horizontal holes and having a pencil joined to its other leg.

2. A machine for tracing colored lines on crystal or glass objects, comprising a horizontal table, a chuck arranged in the center of said table, a plurality of clamps mounted on said chuck, means for moving said clamps toward and away from the center of the chuck, a plurality of tracing devices arranged around said chuck, a frame secured to said table, a buffer held by said frame above the chuck, a spring pressing the buffer against the upper end of the object, and means for permitting the buffer to rotate together with the object.

3. A machine for tracing colored lines on crystal or glass objects, comprising a horizontal table, a rotary plate arranged in the center of said table, means for holding the object to be worked in the center of the plate, means for rendering at will the rotary plate immovable or free to rotate continuously and a plurality of tracing devices arranged around said plate and comprising a vertical plate secured to the table, a pencil holder arranged against a vertical face of the vertical plate with its axis disposed radially with respect to the center of the rotary plate and means for holding the pencil holder against said face and allowing it at the same time to slide freely against said face.

4. A machine for tracing colored lines on crystal or glass objects, comprising a horizontal table, a rotary plate arranged in the center of said table, means for holding the object to be worked in the center of the plate and means for rendering at will the rotary plate immovable or free to rotate continuously, and a plurality of tracing devices arranged around said plate and comprising a vertical post fixed to the table, an arm adapted to be secured at any required height on the post, pencil holders, pencils adapted to slide vertically in said pencil holders and means for fixing said pencil holders at any point required on the length of the arm.

5. A machine for tracing colored lines on crystal or glass objects, comprising a horizontal table a rotary plate arranged in the center of said table means for holding the object to be worked in the center of the plate, means for rendering at will the rotary plate immovable or free to rotate continuously, and a plurality of tracing devices arranged around said plate and comprising a vertical plate fixed to the table and formed with longitudinal slots, a plurality of brackets passing through said slots and adapted to slide and turn therein, a plurality of tubular pencil holders carried by said brackets and means for securing said brackets in the slots, a plurality of pencils slidably mounted in said pencil holders, and springs interposed between said pencil holders and pencils to remove the pencils from the object upon release of manual pressure applied to said pencil holders.

6. A machine for tracing colored lines on crystal or glass objects, comprising a horizontal table, a rotary plate arranged in the center of said table, means for holding the object to be worked in the center of the plate, a plurality of tracing devices arranged around said plate and means for rendering at will the rotary plate immovable or free to rotate continuously, two vertical posts fixed to the table, a plate guided along said posts, a pencil holder carried by said plate, a pencil adapted to slide in said pencil-holder, a vertical post capable of rotation passing through the plate and provided with a helical groove, a screw secured to the plate and projecting in the helical groove of the post so as to cause said post to rotate when the plate is moved vertically, means for transmitting the rotary motion of the post to the rotary plate and means for reversing the direction of rotation of the rotary plate with respect to the movable post.

7. A machine for tracing colored lines on crystal or glass objects, comprising a horizontal table, a rotary plate arranged in the center of said table, means for holding the object to be worked in the center of the plate, a plurality of tracing devices arranged around said plate and means for rendering at will the rotary plate immovable or free to rotate continuously, a vertical plate fixed to the table and having holes bored therein and directed toward the center of the table, a compass, a pencil jointed to one leg of the compass, a point jointed to the other leg of the compass and adapted to be introduced in one of the holes of the vertical plate so as to turn and to slide freely in said hole, and means for fixing all the joints of the compass.

8. A machine for tracing colored lines on crystal or glass objects, comprising a horizontal table, a rotary plate arranged in the center of said table, means for holding the object to be worked in the center of the plate, means for rendering at will the rotary plate immovable or free to rotate continuously, a plurality of tracing devices arranged around said plate and comprising a pencil formed of a tube filled with colored liquid and having a tapered end and a spring actuated valve provided with a point projecting outwardly and normally closing the opening in the tapered end of the pencil.

In testimony whereof I affix my signature in presence of two witnesses.

MAURICE MATHY.

Witnesses:
GEORGE VANDER HAUGHEN,
HENRI JOYEUX.

Copies of this patent may be obtained for five cents each, by addressing the "Commissioner of Patents, Washington, D. C."